United States Patent
Moll et al.

(10) Patent No.: US 7,433,682 B1
(45) Date of Patent: Oct. 7, 2008

(54) METHOD AND SYSTEM FOR PROVIDING LOCATION BASED INFORMATION TO A MOBILE STATION

(75) Inventors: Keith E. Moll, Overland Park, KS (US); Wade H. Toubassi, Overland Park, KS (US); Siling He, Overland Park, KS (US); Larry DeMoss, Lenexa, KS (US); Scott B. Wilson, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1646 days.

(21) Appl. No.: 09/826,139

(22) Filed: Apr. 4, 2001

(51) Int. Cl.
*H04M 3/42* (2006.01)
*H04Q 7/20* (2006.01)
*G01S 3/02* (2006.01)

(52) U.S. Cl. .............. 455/414.1; 455/414.2; 455/456.3; 342/450

(58) Field of Classification Search .............. 455/414.2, 455/414.3, 456.1, 456.2, 456.3, 456.5; 342/450, 342/457, 464, 357.06, 357.07, 357.16
See application file for complete search history.

(56) References Cited

U.S. PATENT DOCUMENTS

| | | | |
|---|---|---|---|
| 5,650,770 A | | 7/1997 | Schlager et al. |
| 5,963,130 A | | 10/1999 | Schlager et al. |
| 6,198,390 B1 | | 3/2001 | Schlager et al. |
| 6,233,448 B1 | * | 5/2001 | Alperovich et al. ......... 455/417 |
| 6,385,458 B1 | * | 5/2002 | Papadimitriou et al. ... 455/456.2 |
| 6,434,381 B1 | * | 8/2002 | Moore et al. ............. 455/414.3 |
| 6,650,902 B1 | * | 11/2003 | Richton .................... 455/456.3 |
| 2002/0107029 A1 | * | 8/2002 | Caughran et al. .......... 455/456 |
| 2003/0060211 A1 | * | 3/2003 | Chern et al. ................ 455/456 |

FOREIGN PATENT DOCUMENTS

WO WO 0004730 * 1/2000

OTHER PUBLICATIONS

"Enhanced Wireless 9-1-1 Phase 2—J-STD-036", Electronics Industry Association/Telecommunications Industry Association, Jul. 2000.
Soliman et al., "Position Location Signaling Protocol", Qualcomm, Inc., Sep. 14-18, 1998.
Yegani et al., "E911 Phase II Support for TIA/EIA-95-B", Qualcomm, Inc., Sep. 14-18, 1998.
Barber, "CDMA Tiered Services—Stage 1 Description, Ver. 1.06", Oki Telecom, Inc., Oct. 20, 1998.
"Location Based Services—Pinpointing What's Hot in Location-Based Services Now and in the Future", International Quality and Productivity Center, Oct. 2000.

* cited by examiner

*Primary Examiner*—George Eng
*Assistant Examiner*—Un C Cho

(57) ABSTRACT

A system and methods for providing location based services to a mobile station in a cellular wireless system. The system includes components that interact with position determining equipment to locate the mobile station within a region that is defined by a service provider. Once the system determines what service is being requested by the mobile station, the system associates the position of the mobile station with a provider-defined region that encompasses the location of the mobile station. A feature of the invention is the manner in which the system associates the provider-defined regions by first determining how the service provider's regions are categorized. The system contacts the service provider for the region over the Internet, and requests information that is appropriate to the position of the mobile station. With this method and system, a mobile station may request information on services that are available in his vicinity.

14 Claims, 4 Drawing Sheets

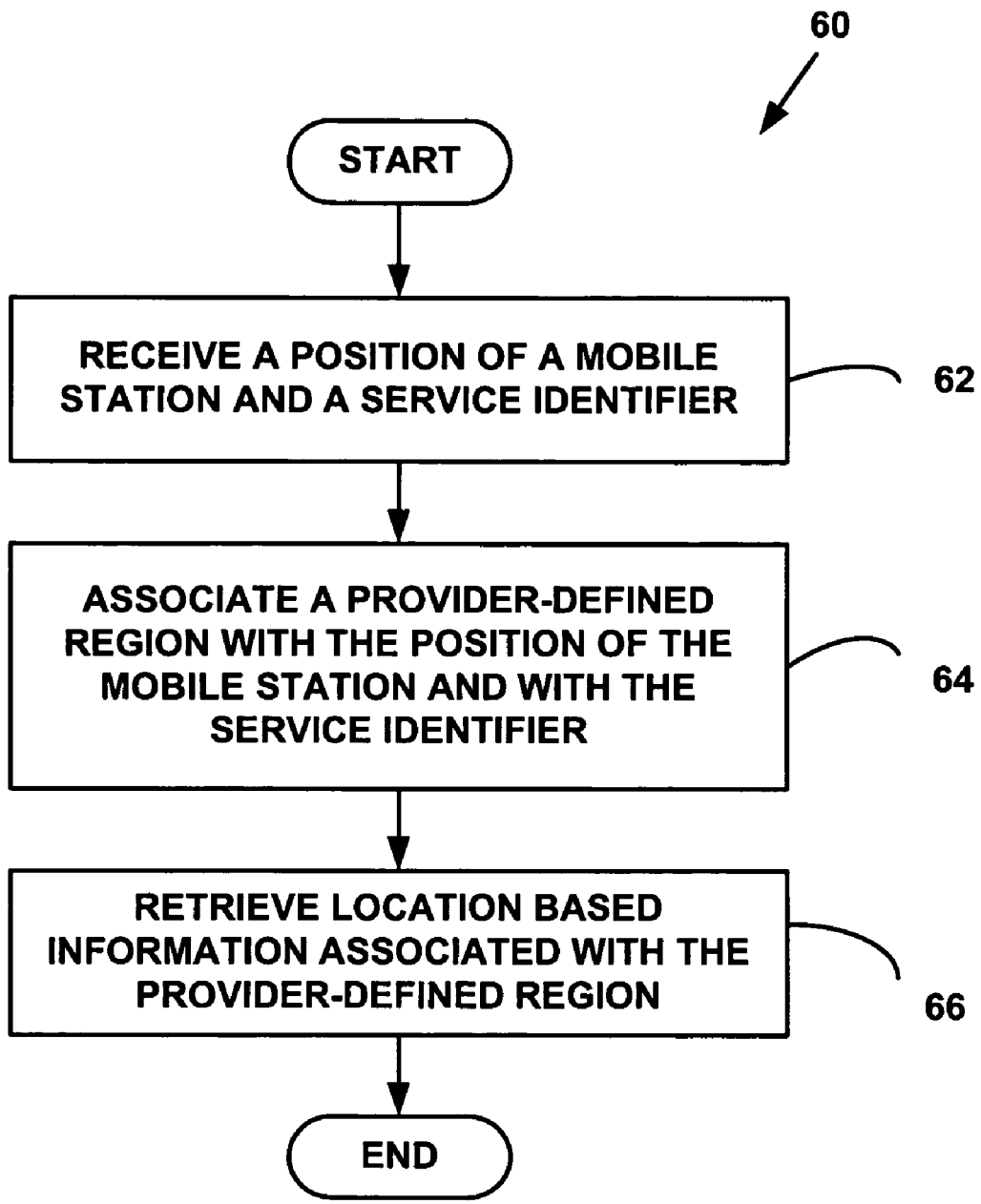

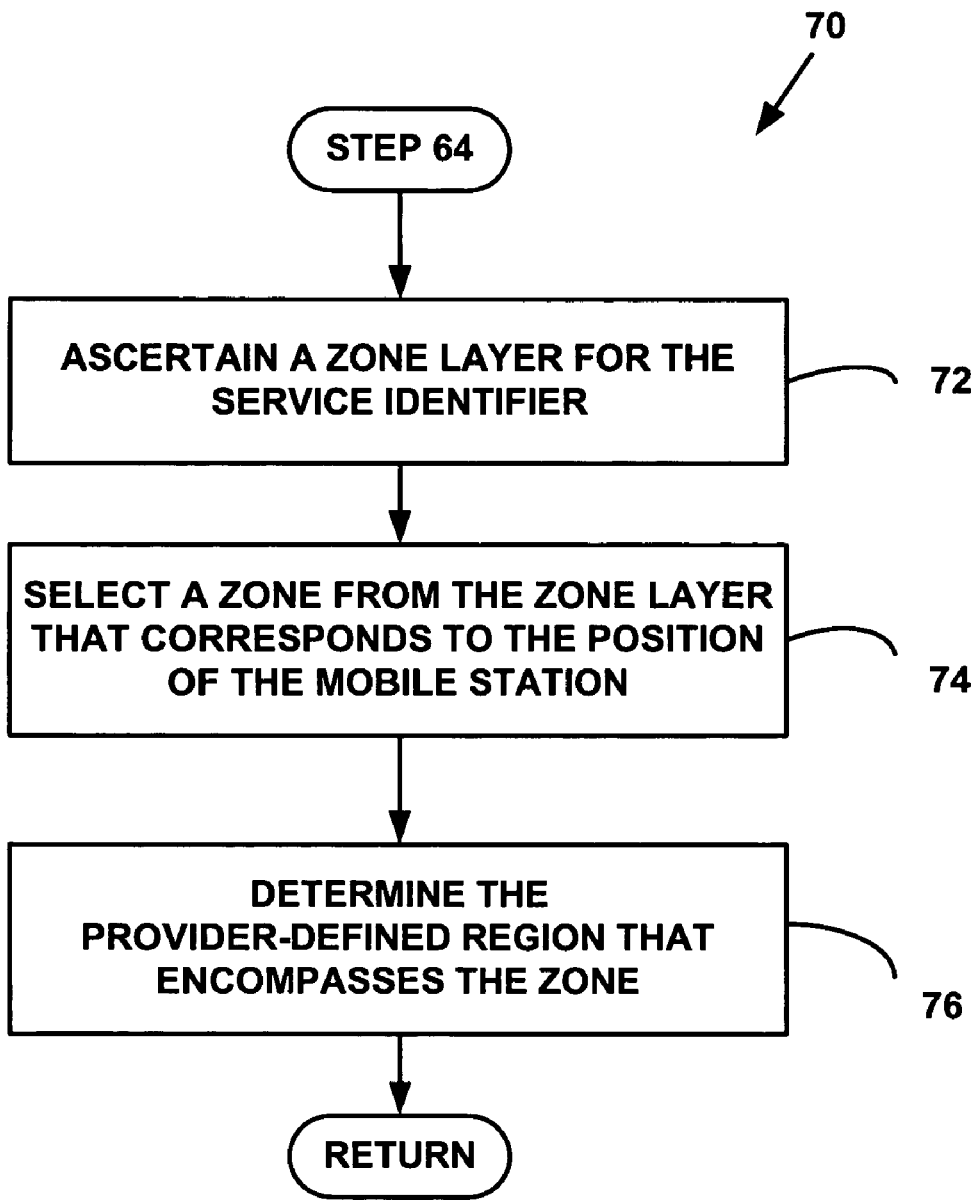

METHOD AND SYSTEM FOR PROVIDING LOCATION BASED INFORMATION TO A MOBILE STATION

FIELD OF INVENTION

The present invention relates to wireless communications networks. More specifically, it relates to a method for providing position based information to a mobile station in a wireless network.

BACKGROUND OF THE INVENTION

Cellular wireless is an increasingly popular means of personal communication in the modern world. People are using cellular wireless networks for the exchange of voice and data over cellular telephones, Personal Digital Assistants ("PDAs"), cellular telephone modems, and other devices. In principle, a user can seek information over the Internet or call anyone over a Public Switched Telephone Network ("PSTN") from any place inside the coverage area of the cellular wireless network.

An important feature of contemporary cellular wireless networks is an ability to locate the geographical position of a mobile station. Such a feature was developed to assist emergency services in locating a mobile station. For example, in the United States, the Federal Communications Commission ("FCC") has mandated the implementation of "Enhanced 911" ("E911") services.

The FCC mandates that E911 services may be introduced in two phases. In the first phase, if a mobile station invokes the service, the cellular wireless network determines in which cell the mobile station is located. The cellular wireless network also responds by blocking all incoming calls to that mobile station so that the emergency services have a clear connection to the mobile station. But a cell, or sector within the cell, may cover a large geographic area. Thus the position information provided to the emergency services in the first phase may not be sufficiently precise to pinpoint the position of the mobile station. Effective response from the emergency services may require a determination of position to within fifty meters or less.

The second phase of the E911 service requires that the cellular wireless network have the ability to locate the mobile station to within fifty meters. A description of the second phase of E911 may be found in Telecommunications Industries Association ("TIA") standard, "TR-45 Enhanced Wireless J-STD-036 911 Phase 2," dated July 2000, which is incorporated herein by reference. The cellular wireless network includes additional position determining equipment in order to achieve such an accuracy, or the mobile station incorporates global positioning system ("GPS") components and relays its position to the emergency services. The emergency services may then obtain an accurate latitude and longitude of the mobile station to assist them in providing assistance to the operator of the mobile station.

Mandating that the cellular wireless network and the mobile station have the above position capabilities has a consequence for commerce. The ability to locate the mobile station may allow providers in the vicinity to provide commercial services and information to the operator of the mobile station through the cellular wireless network. Thus the operator of the mobile station may inquire about what services are offered in his vicinity, and the cellular wireless network will provide such information to the operator. The operator might then have the option of establishing a connection with any chosen provider and receiving the services offered by the provider.

Having such location-based services may allow a mobile station's operator to inquire about services in his vicinity. For example, the Personal Communications Service ("PCS") provided by Sprint Spectrum, LP of Kansas City, Mo., allows the operator to roam anywhere in the United States that is within the coverage of the Sprint PCS service. Thus, if the operator is away from his home area, he may activate a mini-browser on his mobile station and request information about food, gas, lodging, entertainment, hospitals, traffic warnings, weather, etc. in his vicinity.

It is therefore desirable to configure a wireless cellular network to provide location based services to a mobile station such that providers may offer services, through the wireless cellular network, to mobile stations within their vicinity.

SUMMARY OF THE INVENTION

One aspect of the invention is a method for providing location based information for a service to a mobile station in communication with a cellular wireless system. The method includes receiving a position of the mobile station and receiving a service identifier associated with the service. A computer associates a provider-defined region with the position of the mobile station and the service identifier. The computer retrieves the location based information associated with the provider-defined region. In this manner, the mobile station may receive information on services within its vicinity from the cellular wireless network.

Another aspect of the invention is a system for providing location based information for a service to a mobile station in communication with a cellular wireless system. The system includes a switch, position determining equipment, and a computer connected to the switch and to the position determining equipment. The computer runs a program that receives a request for the location based information from the switch. The request includes a service identifier associated with the service. The computer obtains a position of the mobile station from the position determining equipment and associates a provider-defined region with the position of the mobile station and with the service identifier. The computer retrieves the location based information associated with the provider-defined region and provides the location based information to the switch for forwarding to the mobile station.

BRIEF DESCRIPTION OF THE DRAWINGS

The foregoing and other features and advantages of preferred embodiments of the present invention will be more readily apparent from the following detailed description, which proceeds with references to the accompanying drawings, in which:

FIG. 3 is a flow diagram illustrating a preferred method for providing location based information to a mobile station in communication with the cellular wireless system of FIG. 1; and FIG. 4 is a flow diagram illustrating a preferred method for associating the provider-defined region in step 64 of the method illustrated in FIG. 3.

DETAILED DESCRIPTION OF PREFERRED EMBODIMENTS

Figure 1:
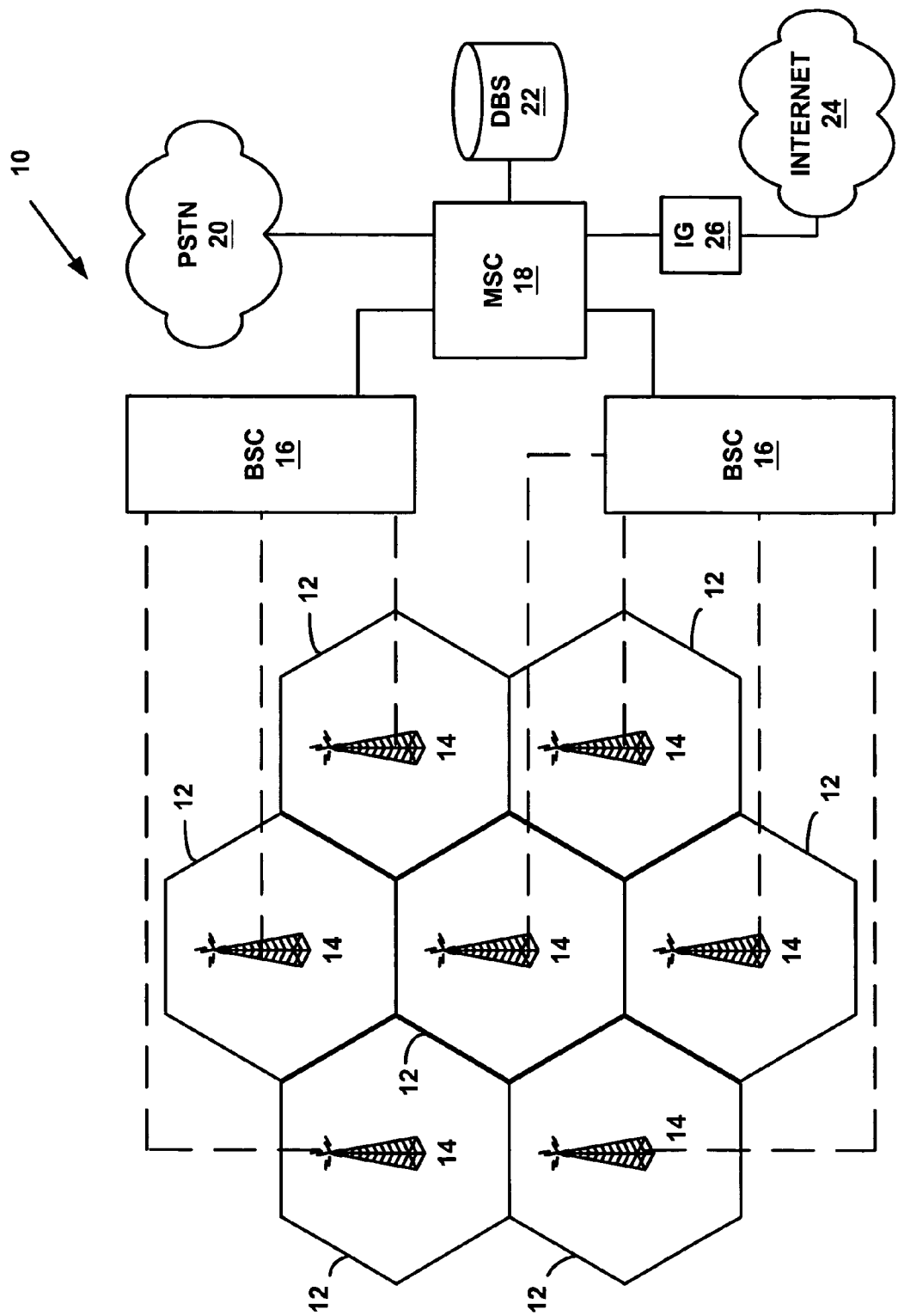
FIG. 1 is a block diagram illustrating components of an exemplary cellular wireless system.

FIG. 1 is a block diagram illustrating components of an exemplary cellular wireless system 10. The system includes multiple cells 12, each of which has a base transceiver station 14, also referred to as a base station, usually at the center of each cell 12. The base stations 14 typically transmit and receive wireless communications to and from mobile stations (not shown). In TDMA systems, each base station 14 typically communicates on a group of frequencies, and each frequency may itself carry at least one multiplexed call. Each base station 14 in a CDMA system, by comparison, communicates over a spread spectrum of frequencies, and the spectrum may carry many multiplexed calls. In a preferred embodiment, the cellular wireless system 10 is a CDMA wireless system. Typical components for CDMA systems include those described in the TIA standard, ANSI/TIA/EIA-95-B-99, dated Feb. 3, 1999, which is incorporated herein by reference.

The base stations 14 connect to base station controllers 16 ("BSCs") that manage handing-off the mobile station when it moves from cell 12 to cell 12. The BSCs connect to a mobile services switching center 18 ("MSC") that manages calls and routes them between a public switched telephone network 20 ("PSTN") and the appropriate cell 12. The MSC 18 also maintains databases 22 ("DBS") that store customer and system information. The MSC's tasks include authenticating and registering mobile stations on the system 10, and processing account information for customers. Additionally, the MSC 18 typically connects to the Internet 24 through an Internet Gateway ("IG") 26 for transferring data between the mobile station and a remote host computer (not shown) that is globally accessible via the Internet 24. It should be understood, however, that the preferred embodiments are not restricted to the cellular wireless system 10 depicted in FIG. 1 and that other components and configurations may support the methods described herein.

Figure 2:
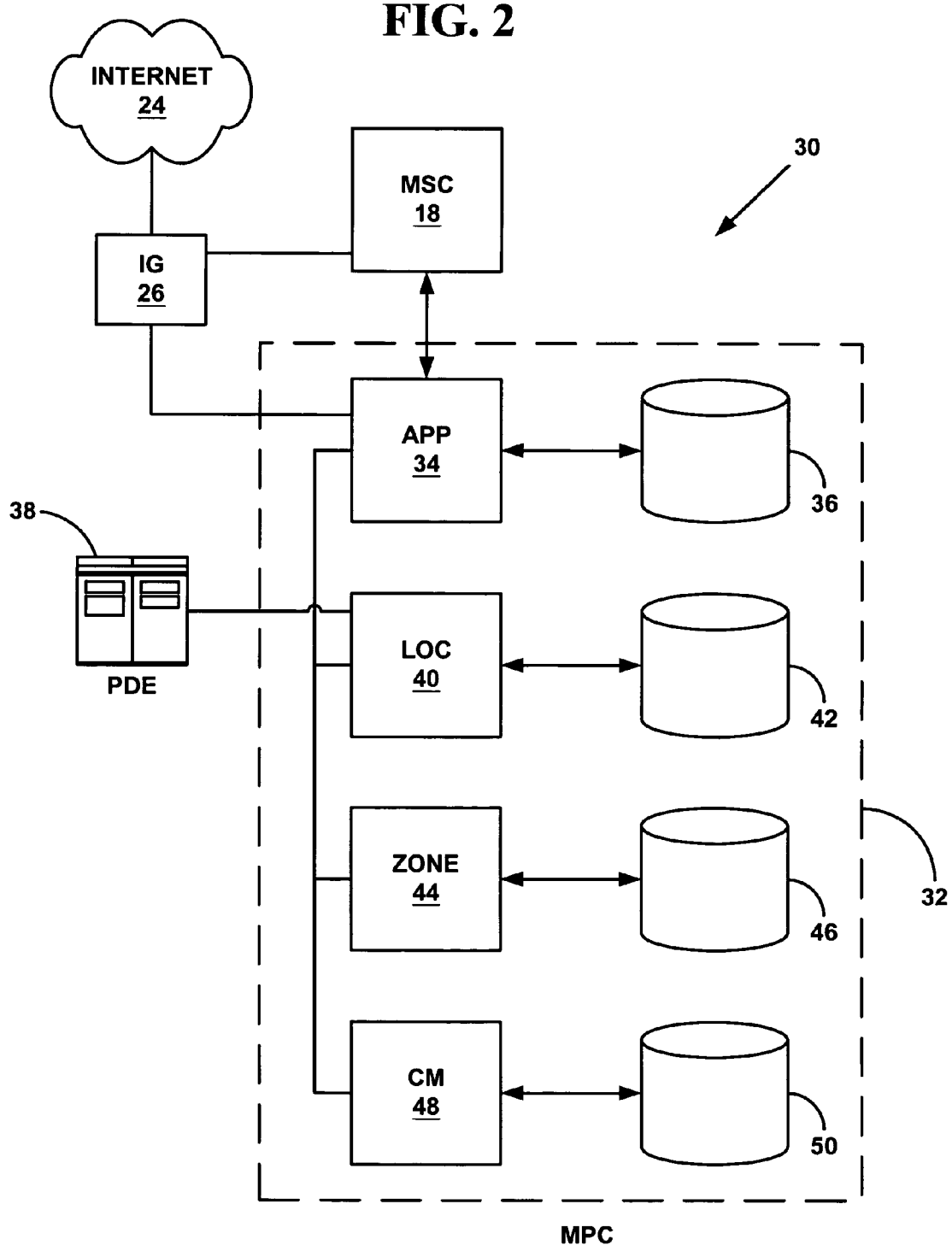
FIG. 2 is a block diagram illustrating preferred position determining components for location based services in the cellular wireless system of FIG. 1.

In order to provide location based services, the cellular wireless system 10 may include components in addition to those shown in FIG. 1. FIG. 2 is a block diagram illustrating preferred position determining components 30 for location based services in the cellular wireless system 10 of FIG. 1. The position determining components 30 include a mobile positioning center ("MPC") 32 that interacts with the MSC 18 when the MSC 18 receives a request for location based information. The MPC 32 processes the requests for location based information, contacts service providers to retrieve the location based information, and provides the location based information to the MSC 18 for forwarding to the mobile station.

Preferred functional elements within the MPC 32 include an application manager ("APP") 34 with an associated APP database 36, a location manager ("LOC") 40 with an associated LOC database 42, a zone manager ("ZONE") 44 with an associated ZONE database 46, and a content manager ("CM") 48 with an associated CM database 50. The IG 26 interfaces with the MSC 18 and MPC 32, through the APP 34, to provide a gateway to the Internet 24. The system elements may be in the form of separate computing devices, such as servers, or in the form of separate but interacting computer programs running on a single server.

In the division of functional elements as illustrated in FIG. 2, the APP 34 installs, runs, and maintains location based service applications. The LOC 40 coordinates the operations of the position determining equipment ("PDE") 38, where the PDE 38 pinpoints the position of the mobile station when required. The ZONE 44 maps the position of the mobile station into provider-defined regions associated with the requested service. The content manager ("CM") 48 provides the format for contacting the service providers to the APP 34 for constructing requests for the location based information. It should be understood, however, that the present invention is not limited to the functional elements as illustrated in FIG. 2, and that other functional elements and their connections are possible.

The PDE 38 may be integrated with the base stations 14 of the cellular wireless network 10 and may also include other radio-frequency processing or collating devices for providing the geographical coordinates of the mobile station to the MPC 32. The PDE 38 determine the position of the mobile station by a variety of methods. For example, the PDE 38 may instruct the mobile station to activate a GPS receiver associated with the mobile station and to relay the coordinates to the PDE 38. In another method for determining the position, the PDE 38 may instruct the mobile station to measure the relative signal strengths of three or more base stations 14, which signal strengths provide a basis for a calculation of the location. In yet another method, the PDE 38 may instruct three of more base stations 14 to measure the signal strength of the mobile station and calculate the position of the mobile station based on the measurements. Additional methods for PDE 38 operation include methods for measuring position such as a time difference of arrival ("TDOA") method or an angle of arrival ("AOA") method, which are known to those of ordinary skill in the art. It should be understood, however, that the position determining system 30 of the preferred embodiments is not restricted to the components shown in FIG. 2 and that other components and configurations may support the methods described herein.

An operating environment for the MPC 32 and other devices of the present invention includes a processing system with at least one central processing unit ("CPU") (not shown) and a memory system (not shown). Preferably, one or more CPU controls the operations of the MPC 32. In accordance with the practices of persons skilled in the art of computer programming, the preferred methods are described herein with reference to acts and symbolic representations of operations that are performed by the processing system, unless indicated otherwise. The one or more CPU may also instruct the MPC's 32 memory system to read or write data to or from the databases 36, 42, 46, and/or 50.

It will be appreciated that the acts and symbolically represented operations include the manipulation of electrical signals by the one or more CPU. The electrical signals represent data bits that cause a resulting transformation or reduction of the electrical signal representation. The MPC 32, databases 36, 42, 46, and/or 50, and other devices may maintain data bits at memory locations in their respective memory system to reconfigure or otherwise alter their CPU's operation, as well as other processing of signals. The memory locations, such as random access memory ("RAM"), are physical locations that have particular electrical, magnetic, or optical properties corresponding to the data bits, depending on the type of memory used.

FIG. 3 is a flow diagram illustrating a preferred method 60 for providing location based information to a mobile station in communication with the cellular wireless system 10 of FIG. 1. The method 60 includes receiving a position of the mobile station and a service identifier at step 62. At step 64, the cellular wireless system 10 associates a provider-defined region with the position of the mobile station and with the service identifier. The cellular wireless system 10 retrieves the location based information that is associated with the provider-defined region at step 66.

At step 62, the MPC 32 receives the position of the mobile station and the service identifier. The MSC 18 receives a request for location based information from the mobile station and passes the request to the MPC 32. In a preferred embodiment, the application manager ("APP") 34 receives the service identifier. The APP 34 associates a level of granularity with the service identifier by querying an associated APP database 36. For example, E911 services may require a high degree of granularity, on the order of 50 meters, to allow emergency personnel to pinpoint the position of the mobile station. But a request for the local weather need only provide information with a granularity of a few miles. The APP 34 therefore determines how accurately the position of the mobile station has to be measured in order to provide the requested service to the mobile station.

The APP 34 decides whether the granularity of the requested service is sufficiently low that it covers the present cell 12, in which case a cell identifier is sufficient information for defining the geographic limitations of the requested service. For example, the MPC 32 may instruct the MSC 18 to provide the MPC 32 with a cell identifier that distinguishes one cell 12 or base station 14 from another within the cellular wireless system 10. Examples of a cell identifier include identity designations for the cells 12 or base stations 14 as used for internal operation of the cellular wireless system 10, geographic coordinates of the base station 14 for the cell 12 in proximate communication with the mobile station within the cell 12, or an identification for cells 12 agreed upon between the cellular wireless company and service providers.

If the required granularity for the service is sufficiently high, however, such as E911 service, the APP 34 may require that the PDE 38 operate to locate the mobile station within a cell 12. The location manager ("LOC") 40 coordinates the operations of the PDE 38 when the APP 34 indicates that the service identifier is associated with a high granularity. The LOC 40 receives the positional data from the PDE 38 and combines the data to form the most accurate estimate of the mobile station's position. The LOC 40 maintains a LOC database 42 for maintaining device-specific information on the PDE 38. In operation, the LOC 40 selects the PDE 38 to determine the position of the mobile station that has requested the information. In an alternative embodiment, the mobile station includes GPS equipment for determining the GPS coordinates, typically latitude and longitude, of the mobile station. When the mobile station requests location based information, it makes a GPS measurement and relays its GPS coordinates to the APP 34 through the MSC 18. Thus, in the preferred embodiments described above, the APP 34 receives the position of the mobile station to the level of granularity appropriate to the service that the mobile station is requesting.

At step 64 of the method 60 of FIG. 3, the MPC 32 associates a provider-defined region with the position of the mobile station and with the service identifier. In a preferred embodiment, upon determining the position of the mobile station to the appropriate level of granularity, the APP 34 communicates the service identifier to the zone manager ("ZONE") 44. The ZONE 44 also receives the position of the mobile station to the level of granularity appropriate for the service identifier. For example, if the associated granularity is the size of one cell 12 of the cellular wireless network 10, then the ZONE 44 receives a cell identifier for the cell 12 in the cellular wireless network 10. If the associated granularity is finer than one cell 12, however, the ZONE 44 receives the position of the mobile station from the LOC 40. If the mobile station includes GPS equipment, the ZONE 44 receives the GPS coordinates of the mobile station.

The ZONE 44 maps the position of the mobile station into provider-defined regions associated with the requested service identifier. The ZONE 44 stores the provider-defined regions in a ZONE database 46. For example, a request for pizza delivery may be categorized as of medium granularity, perhaps within two miles in an urban setting. The ZONE 44 may determine that for three service providers of pizza delivery in the vicinity of the mobile station, the mobile station is within Pizza Vendor One region #51, Pizza Vendor Two region #345, and Pizza Vendor Three region #2.

At step 66 of the method 60 of FIG. 3, the cellular wireless system 10 retrieves the location based information associated with the provider-defined region. In a preferred embodiment, the ZONE 44 passes the provider-defined zones to the APP 34, which maps each provider-defined region to a universal resource locator ("URL") for the service provider. The APP database 36 maintains the URLs for the service providers. The APP 34 requests information from the service provider at the URL by transmitting a request for the location based information. Upon receiving a response from the URL, the APP 34 transfers returned information to the MSC 18 for forwarding to the mobile station.

Also, the APP 34 may associate a surrogate identifier with the mobile station and store the surrogate identifier in the APP database 34. The requests for the location based information from the service providers at the URLs include the surrogate identifier for the mobile station. The requests do not contain any other identifier that may permit the service providers to obtain the true identity of the mobile station, such as the mobile station's telephone number or serial number familiar to those of ordinary skill in the wireless telephony art. An example of a surrogate identifier is a transaction key, familiar to those of ordinary skill in the computing art. Transaction keys may be formed from date and time stamps of the request for location based information, or they may be randomly generated. Use of the surrogate identifier for the mobile station maintains the anonymity of the mobile station to the service providers, with an exception that a request for E911 service requires that the APP 40 provides the true identity of the mobile station to the emergency services provider.

The APP 34 sends requests for information over the Internet 24 to the service providers at the URLs. Each service provider may require that requests to its URL follow a particular format. The content manager ("CM") 48 provides the format to the APP 34 for constructing the requests. A CM database 50 stores the format of the requests for the particular service providers. As an alternative to storing the URLs in the APP database 36, the CM database 50 may store the URLs of the requested service.

The service providers each receive a request that includes the surrogate identifier and an appropriately formatted request for information. In response to the requests, the service providers send the location based information to the APP 34 over the Internet 24. The APP 34 receives the response and determines whether the response contains the surrogate identifier in order to decide to which mobile station to provide the location based information. The APP 34 associates the location based information with the mobile station by matching the surrogate identifier to the mobile station in the APP database 36. The APP 34 passes the information to the MSC 18, which forwards the information to the mobile station.

In an alternative embodiment, the CM database 50 may retain some immutable information on the requested service that need not be recalled from the service provider each time a service is requested. For example, service provider defined mini-browser pages may be immutable and the pages need not be sent through the Internet 24 each time that a mobile station initiates location based services. Thus the CM 48 may determine whether the request from the mobile station requires immutable location based information and so may direct the APP 34 not to request the immutable information from the service provider. Instead the CM 48 reads the immutable information from the CM database 50 and sends it to the MSC 18 for forwarding to the mobile station.

Zones and Zone Layers

Zones are non-overlapping geographical areas that may be contiguous. There are, however, many ways to define and categorize zones depending on the type of service requested. For example, common ZIP codes may categorize and distinguish zones for weather information or restaurants, highway distance markers may categorize zones for roadside assistance or truck stops, and city names may categorize zones for major league sports information or art galleries. Each categorization is termed a "zone layer." Thus for the zone layer consisting of ZIP codes, each zone in the ZIP code zone layer is a distinct ZIP code, and for the zone layer consisting of city names, each zone in the city name zone layer is a distinct city name.

FIG. 4 is a flow diagram illustrating a preferred method 70 for associating the provider-defined region in step 64 of the method 60 illustrated in FIG. 3. The method 70 includes ascertaining a zone layer for the service identifier, at step 72. The zone layer is a categorization of zones for the service identifier. At step 74, the MPC 32 selects a zone from the zone layer that corresponds to the position of the mobile station. The MPC 32 determines the provider-defined region that encompasses the zone, at step 76.

As described above, the APP 34 communicates the service identifier, received from the MSC 18, and the position of the mobile station to the ZONE 44, where the service identifier and position are mapped to provider-defined zones. In one preferred embodiment, the APP 34 maps the service identifier to a service type and maps the service type to a zone layer by examining the APP database 36. For example, if the MSC 18 indicates to the APP 34 that the mobile station is requesting pizza delivery, the APP 34 may map this to a service type for restaurants, and map the service type for restaurants to the ZIP code zone layer.

Consequently, when the APP 34 communicates the service identifier to the ZONE 44, the APP 34 also communicates the zone layer. The ZONE 44 maps the position of the mobile station to a zone in the zone layer. The ZONE 44 also maps the zone to the provider-defined regions in the ZONE 46 database. For the pizza delivery example above, the ZONE 44 may map the position to ZIP code 66213 in the ZIP code layer, and map zip code 66213 for the service identifier for pizza delivery to provider-defined regions Pizza Vendor One region #51, Pizza Vendor Two region #345, and Pizza Vendor Three region #2. The ZONE 44 communicates the provider-defined regions to the APP 34, which in turn maps each provider-defined region to a URL.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or component may be used in the block diagrams.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

We claim:

1. A method for providing location based information to a mobile station in communication with a cellular wireless system, the method comprising the steps of:
   receiving a request for location based information regarding a service, the request including a service identifier, wherein the service identifier is associated with the service;
   associating a level of granularity with the service identifier;
   based on the service identifier, instructing the cellular wireless system to determine the position of the mobile station at the associated level of granularity;
   receiving a position of the mobile station;
   associating a provider-defined region with the position of the mobile station and with the service identifier; and
   retrieving the location based information, wherein the location based information is associated with the provider-defined region.

2. A computer readable medium having stored therein instructions for causing a central processing unit to execute the method of claim 1.

3. The method of claim 1 wherein the associating step comprises the steps of:
   ascertaining a zone layer for the service identifier, wherein the zone layer is a categorization of zones for the service identifier;
   selecting a zone from the zone layer, wherein the zone corresponds to the position of the mobile station; and
   determining the provider-defined region that encompasses the zone.

4. The method of claim 1 wherein the instructing step comprises the steps of:
   determining whether the level of granularity is a low level of granularity; and
   when the level of granularity is the low level of granularity, assigning a cell identifier as the position of the mobile station.

5. The method of claim 1 wherein the instructing step comprises the steps of:
   determining whether the level of granularity is a high level of granularity; and
   when the level of granularity is the high level of granularity, instructing position determining equipment to provide the position of the mobile station.

6. The method of claim 1 wherein the step of receiving a position of the mobile station comprises the step of:
   receiving global positioning system coordinates from the mobile station, wherein the coordinates represent the position of the mobile station.

7. The method of claim 1 wherein the retrieving step comprises the steps of:
   mapping the provider-defined region to a universal resource locator;
   transmitting a request for the location based information to the universal resource locator; and receiving a response containing the location based information from the universal resource locator.

8. The method of claim 7 further comprising the steps of:
associating a surrogate identifier with the mobile station, wherein the request includes the surrogate identifier but no other identifier for the mobile station;
determining whether the response contains the surrogate identifier; and
when the response contains the surrogate identifier, associating the location based information with the mobile station.

9. The method of claim 1 wherein the retrieving step comprises the step of:
reading the location based information from a database entry, wherein the database entry is associated with the provider-defined region.

10. The method of claim 1 further comprising the step of:
providing the location based information associated with the provider-defined region to the mobile station.

11. A method for providing location based information to a mobile station in communication with a cellular wireless system, the method comprising the steps of:
receiving a request for location based information regarding a service, the request including a service identifier, wherein the service identifier is associated with the service;
associating a level of granularity with the service identifier;
based on the service identifier, instructing the cellular wireless system to determine the position of the mobile station at the associated level of granularity;
receiving a position of the mobile station;
associating a provider-defined region with the position of the mobile station and with the service identifier; and
retrieving the location based information, wherein the location based information is associated with the provider-defined region;
wherein the retrieving step comprises the steps of:
mapping the provider-defined region to a universal resource locator;
transmitting a request for the location based information to the universal resource locator;
receiving a response containing the location based information from the universal resource locator;
associating a surrogate identifier with the mobile station, wherein the request includes the surrogate identifier but no other identifier for the mobile station;
determining whether the response contains the surrogate identifier; and
when the response contains the surrogate identifier, associating the location based information with the mobile station.

12. A system for providing location based information to a mobile station in communication with a cellular wireless system, comprising:
a switch;
position determining equipment; and
a computer connected to the switch and to the position determining equipment, wherein the computer runs a program that performs the steps of:
receiving from the switch a request for location based information regarding a service, wherein the request includes a service identifier, and wherein the service identifier is associated with the service;
associating a level of granularity with the service identifier;
based on the service identifier, instructing the cellular wireless system to determine the position of the mobile station at the associated level of granularity;
obtaining a position of the mobile station from the position determining equipment;
associating a provider-defined region with the position of the mobile station and with the service identifier;
retrieving the location based information associated with the provider-defined region; and
providing the location based information to the switch for forwarding to the mobile station.

13. A method for providing location based information to a mobile station in communication with a cellular wireless system, the method comprising the steps of:
receiving a request for location based information regarding a service, the request including a service identifier, wherein the service identifier is associated with the service;
associating a level of granularity with the service identifier;
instructing the cellular wireless system to determine a position of the mobile station at the associated level of granularity;
associating a zone layer with the service identifier, wherein the zone layer is a categorization of zones for the service identifier;
selecting a zone from the zone layer, wherein the zone corresponds to the position of the mobile station;
determining a provider-defined region that encompasses the zone;
mapping the provider-defined region to a universal resource locator;
transmitting a request for the location based information to the universal resource locator;
receiving a response containing the location based information from the universal resource locator; and
providing the location based information to the mobile station.

14. A computer readable medium having stored therein instructions for causing a central processing unit to execute the method of claim 13.

* * * * *